US011283326B2

(12) United States Patent
Schleicher

(10) Patent No.: US 11,283,326 B2
(45) Date of Patent: Mar. 22, 2022

(54) ACTUATOR MODULE AND METHOD FOR PRODUCING AN ACTUATOR MODULE

(71) Applicant: HANON SYSTEMS BAD HOMBURG GMBH, Bad Homburg (DE)

(72) Inventor: Daniel Schleicher, St. Valentin (AT)

(73) Assignee: Hanon Systems Bad Homburg GmbH, Bad Homburg V. D. Höhe (DE)

(*) Notice: Subject to any disclaimer, the term of this patent is extended or adjusted under 35 U.S.C. 154(b) by 101 days.

(21) Appl. No.: 16/621,438

(22) PCT Filed: Jun. 5, 2018

(86) PCT No.: PCT/EP2018/064797
§ 371 (c)(1),
(2) Date: Dec. 11, 2019

(87) PCT Pub. No.: WO2018/228873
PCT Pub. Date: Dec. 20, 2018

(65) Prior Publication Data
US 2021/0126506 A1 Apr. 29, 2021

(30) Foreign Application Priority Data
Jun. 12, 2017 (DE) .................. 10 2017 209 895.3

(51) Int. Cl.
H02K 7/08 (2006.01)
H02K 5/167 (2006.01)

(52) U.S. Cl.
CPC ........... H02K 5/1672 (2013.01); H02K 7/083 (2013.01)

(58) Field of Classification Search
CPC ............ H02K 1/12; H02K 1/24; H02K 16/02; H02K 5/1672; H02K 7/083
(Continued)

(56) References Cited

U.S. PATENT DOCUMENTS 3,319,093 A * 5/1967 Abdul .................. H02K 5/132
310/50
5,806,169 A * 9/1998 Trago ..................... H02K 5/08
29/596

(Continued)

FOREIGN PATENT DOCUMENTS

CH 299046 A 5/1954
CN 102738986 A 10/2012
(Continued)

OTHER PUBLICATIONS

First Office Action regarding Chinese Patent Application No. 201880039099.2, dated Jan. 27, 2021.

Primary Examiner — Terrance L Kenerly
(74) Attorney, Agent, or Firm — Harness, Dickey & Pierce, P.L.C.

(57) ABSTRACT

The disclosure relates to an actuator module at least consisting of an electrical machine and an application module. The electrical machine consists of a stator and a rotor, the rotor is slidably mounted directly on the stator, and the stator and the rotor are surrounded with plastic at least in the region of the inner bearing face. The plastic coating of the cylindrical rotor outer face has structures which extend as a spiral continuously over the height of the rotor.

13 Claims, 1 Drawing Sheet

(58) Field of Classification Search
USPC .......................................................... 310/90
See application file for complete search history.

(56) References Cited

U.S. PATENT DOCUMENTS

| | | | | |
|---|---|---|---|---|
| 5,942,824 | A * | 8/1999 | Shioya | H02K 11/33 |
| | | | | 310/90.5 |
| 6,133,660 | A * | 10/2000 | Suzuki | F16C 33/103 |
| | | | | 310/156.26 |
| 6,232,690 | B1 * | 5/2001 | Schmider | F04D 25/0653 |
| | | | | 310/112 |
| 2002/0093262 | A1 * | 7/2002 | Zepp | H02K 21/024 |
| | | | | 310/90 |
| 2008/0192362 | A1 | 8/2008 | Huang et al. | |

FOREIGN PATENT DOCUMENTS

| | | |
|---|---|---|
| DE | 10302084 A1 | 5/2004 |
| EP | 0229911 A1 | 7/1987 |
| EP | 0903835 A1 | 3/1999 |

* cited by examiner

ACTUATOR MODULE AND METHOD FOR PRODUCING AN ACTUATOR MODULE

CROSS-REFERENCE TO RELATED APPLICATIONS

This application is a 371 U.S. National Phase of International Application No. PCT/EP2018/064797, filed Jun. 5, 2018, which claims the benefit of German Application No. 10 2017 209 895.3, filed Jun. 12, 2017. The entire disclosures of each of the above applications are incorporated herein by reference.

FIELD

The disclosure relates to an actuator module comprising at least of an electric machine and an application module, wherein the electric machine is composed of a stator and a rotor, wherein the rotor in a plain bearing is mounted directly on the stator, and the stator and the rotor at least in the region of the inner bearing face are surrounded by or produced from a plastics material or another low-friction material.

The disclosure furthermore relates to a method for producing an actuator module.

BACKGROUND

This section provides background information related to the present disclosure which is not necessarily prior art.

Actuators form a substantial part of electronic feedback control systems in motor vehicles and commercial vehicles. The task of said actuators lies in converting the electrical signals of a control apparatus to a mechanical action such as a linear displacement or an angular adjustment. The actuators are in most instances electric motors or electromagnetic valves which permit flaps to be adjusted, the flow of liquids to be regulated, and pumps to be activated in order for pressure to be built up, for example in braking and steering systems.

Moreover, said actuators are used in engine control units and in comfort systems.

The increasing environmental constraints for modern vehicles set ever higher requirements in terms of low fuel consumption and low pollutant emissions. Nevertheless, the customers demand maximum output and best ride comfort. These requirements can only be met by way of high-performance actuators which precisely supply the engine with the quantity of fuel required and accurately control the supply of fresh air and the return of exhaust gas in order for the output and the pollutant behavior to be optimized.

Actuators in engine control units assume the task of regulating the idling speed, controlling air-guiding flaps for optimizing torque and output, and metering the fuel for optimal combustion.

Moreover, actuators in comfort systems are used, for example, for locking and unlocking vehicle doors, or for the remote activation of fuel caps, tailgates, engine hoods, and storage compartments.

Numerous safety and assistance systems have been able to be implemented in recent years thanks to high-performance actuators in the most varied embodiments.

Actuators in the prior art have electric motors, the rotor shaft of said electric motors being held in at least one bearing outside the stator. On account thereof, the installation space of the electric machines is increased by at least said bearing.

An electric machine is known from CH299046B1, wherein the mutually opposite surfaces of the active parts of an electric machine that are movable relative to one another simultaneously represent the guiding faces of the mounting of the revolving part. The faces can be machined in a particular manner, or be formed by layers from particular materials, and slide on one another while the machine is running. A liquid or gaseous lubricant for reducing the friction and for centering the revolving part in the clearance of the mounting can be provided herein.

SUMMARY

This section provides a general summary of the disclosure, and is not a comprehensive disclosure of its full scope or all of its features.

It is therefore an object of the disclosure to propose an actuator having a directly mounted electric machine for the various applications in a vehicle.

The object is achieved by an actuator module composed of at least of an electric machine and an application module, wherein the electric machine is composed of a stator and a rotor, wherein the rotor in a plain bearing is mounted directly on the stator, and the stator and the rotor at least in the region of the inner bearing face are surrounded by a plastics material, wherein the plastics material coating of the cylindrical rotor external face has structures which as a spiral extend continuously across the construction height of the rotor.

Friction is minimized and the heating of the bearing face is avoided on account of the structuring of the bearing face. The spiral shape herein is particularly suitable for a simple production process.

It is advantageous for the rotor to be pretensioned in relation to the stator, so as to achieve better centering of the rotor in the stator bearing face.

It is particularly favorable for the rotor to be pretensioned by way of a force by virtue of the magnetic flux between a non-centric stator and the rotor. The pretensioning is thus achieved solely in the electric motor.

Alternatively however, it is also advantageous for the rotor to be pretensioned by way of a force on a shaft of the rotor. In this instance, the application module is used; the axial pretensioning of the rotor can be performed by way of the application module and preparations no longer have to be made in the electric machine. In principle, the application module could also absorb all the axial forces.

It is advantageous herein for the rotor to be pretensioned counter to a centering spring.

The structures of the rotor external face are composed of grooves and/or ribs, this simplifying a production by the injection-molding method.

It is necessary herein for at least one groove and/or rib to run across the entire external shell of the rotor.

The construction height of the electric machine is advantageously determined by the height of the end windings of the stator and no longer by the bearings of the rotor.

The electric machine is covered by a housing part of the application module and thus does not require a dedicated cover.

It is advantageous for the rotor to be a plastics material injection-molded component.

The rotor contains overmolded magnets which are fastened in a captive manner and are cast or overmolded conjointly with the rotor per se in one production step.

The method according to the disclosure for producing an actuator module comprises that the rotor is produced in a cylindrical tool, and demolding is performed by rotating the rotor out of the tool.

DRAWINGS

The drawings described herein are for illustrative purposes only of selected embodiments and not all possible implementations, and are not intended to limit the scope of the present disclosure.

The disclosure will be described hereunder in an exemplary manner with reference to the appended drawing in which.

Corresponding reference numerals indicate corresponding parts throughout the several views of the drawings.

DETAILED DESCRIPTION

Example embodiments will now be described more fully with reference to the accompanying drawings.

Figures 1A, 1B:
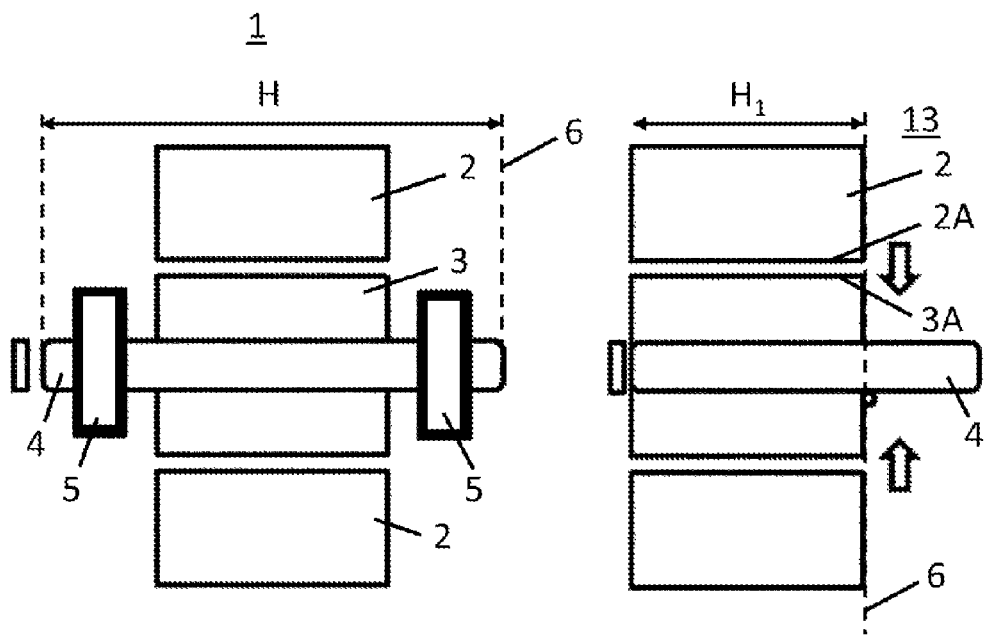
FIG. 1 shows a schematic illustration of an exemplary embodiment.

An actuator module having an electric machine 1 in a conventional construction mode is schematically illustrated in FIG. 1a.

A stator 2 surrounds a rotor 3 which is rotatably mounted on a shaft 4. The rotor is fixedly connected to the shaft. The shaft at the bearing locations is mounted so as to be rotatable by, for example, ball bearings, or else plain bearings. The shaft 4 is supported at two bearing locations 5. The entire construction height H of the electric motor extends from a shaft stump on the bearing 5 up to a second shaft stump on the second bearing. The dashed line on the right represents the linking plane 6 to an application module. The application module, for example a linear adjuster, or a reduction gear, is attached here in a suitable manner. The functional group consisting of an electric machine having an application module is thus to be understood as the actuator module.

The solution according to the disclosure is illustrated in FIG. 1B. The stator 2 again surrounds the rotor 3 but no separate bearing locations are any longer present to the left and the right of the rotor on the shaft 4. The linking plane 6 to the application module lies in the plane of the surface of the stator and of the rotor. The mounting of the rotor herein is performed directly by way of the mutually opposite surfaces of the stator 2A and the rotor 3A.

The construction height H1 of the electric machine is significantly reduced on account thereof.

In order for the bearing faces 2A and 3A to be designed in a particularly favorable manner and for the entire electric machine to be shielded in relation to external influences, the stator as well as the rotor are overmolded with a plastics material. Plastics materials which are particularly suitable for injection molding and also have lubricating properties are used as material herein. Such materials such as Teflon are already used in plain bearings. A mounting by way of two plastics material surfaces will be sufficient in the normal case, since the electric machine of an actuator is not a permanently running electric machine but is activated only for switching procedures. The periods of use are thus limited, and overheating of the machine is not to be anticipated.

On account of the rotor by way of the bearing face 3A thereof bearing directly on the bearing face 2A of the stator, the air gap between the stator and the rotor is reduced and a lower magnetic resistance is thus achieved.

However, it is also possible for a lubrication by way of a lubricating oil or a lubricating grease to be applied so as to reduce friction losses and to largely prevent a degradation of the plastics material.

Figure 2:
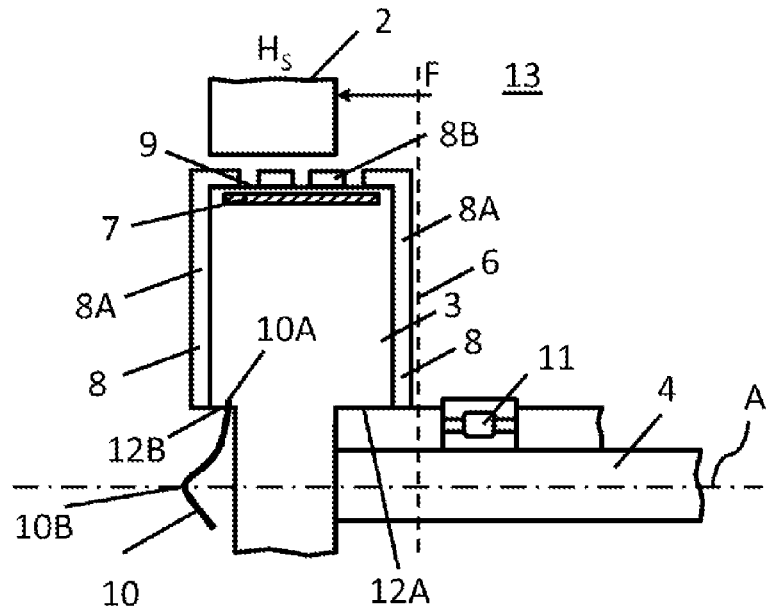
FIG. 2 shows a detail of the embodiment.

A detail of the solution according to the disclosure is illustrated in FIG. 2, wherein only the upper part of the section is embodied in the figure. The electric motor is constructed so as to be symmetrical with the central axis A. The stator 2 surrounds the rotor 3, but the stator in terms of the construction height $H_S$ thereof is reduced in relation to the construction height of the rotor 3. The rotor is surrounded by a plastics material layer in this exemplary embodiment. The plastics material layer 8 herein surrounds the two end faces 8A of the rotor as well as the cylindrical external face 8B. The cylindrical external face has grooves 9 which interrupt, or structure, respectively, the plastics material coating. Said grooves or else ribs are attached to the cylindrical external face of the rotor in a spiral manner. Only a single groove or rib can also be used which in this instance in multiple helices extends in a spiral manner across the entire cylindrical external face of the rotor.

However, it is also possible for a plurality of mutually parallel ribs or grooves having different starting points on the external face to be used.

The rotor again sits on a shaft 4 which in relation to the outside is sealed with a seal 11. The linking plane 6 herein lies directly on the surface of the plastics material coating 8A at the end side. The rotor in the region of the shaft 4 has constrictions 12A and 12B which reduce the construction height of said rotor at those locations. Linking to the application module is performed in the constriction 12A, said application module (not illustrated in the figure) adjoining to the right of the linking plane 6. The constriction 12B serves for receiving a spring 10 which as a dome spring is fastened in the rotor by way of the external peripheries 10A of said spring 10. The spring herein can already have been directly overmolded or cast.

Magnets 7 are attached in the rotor. The magnets are plastics-material bonded magnets, or rare earth magnets. The rotor and the magnets are conjointly overmolded or cast.

The sheathing of the rotor with the plastics material does not have to extend across the entire rotor. Only the configuration of a plastics material layer on the cylindrical external face 8B is of initial importance. Said external layer which is illustrated by grooves 9 or spiral ribs, serves for mounting the stator 2. The stator windings are attached so as not to be centric in relation to the rotor 3.

On account thereof, a force F which pretensions the rotor against the stator in the axial direction results when the coils are energized.

The pretensioning is performed counter to the spring force of the spring 10 which, in addition to the actual mounting of the rotor in a plain bearing in the stator guarantees radial centering. Furthermore, a minimum spacing between the stator and the rotor end face is ensured by way of the spring. The spring tip configures a mandrel 10B such that a punctiform mounting is performed here.

In one alternative embodiment, the stator and the rotor are mutually centered, and a pretensioning force on the rotor 3 is exerted by way of the application module and the shaft 4.

In one further alternative embodiment, the rotor is completely cast from plastics material. The structures, the grooves or ribs 9, herein are already produced directly by plastics material injection molding. It is particularly favorable herein for the magnets 7 to be already preassembled in the rotor and then to be simply overmolded.

In one alternative embodiment, the grooves and ribs are attached to the stator.

Furthermore conceivable is an embodiment having an acrylic coating of either the stator and/or of the rotor, or a combination of materials.

It is also conceivable for the surfaces to be polished such that the friction is minimal.

In one further embodiment, magnets from non-metallic materials are additionally used and conjointly overmolded. One example is PANiCNQ, and non-metallic plastics material which displays ferromagnetic properties at room temperature.

The structures 9 disposed in a spiral manner are also particularly advantageous in terms of the production of said structures 9 by injection molding. The tool in which the rotor 3 is either overmolded as a metallic component, or is completely molded as an entire component, does not have to be opened for demolding the rotor. An integral almost cylindrical tool insert can be used, since the rotor can be retrieved from the tool by way of a rotating demolding movement.

This method can also be applied with the stator, in that the grooves are likewise produced directly in the injection-molding tool.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. An actuator module comprising an electric machine and an application module, wherein the electric machine comprises a stator and a rotor, wherein the rotor in a plain bearing is mounted directly on the stator, and the stator and the rotor at least in the region of the inner bearing face are surrounded by a plastics material or another low-friction material, wherein the plastics material coating of the cylindrical rotor external face or of the stator internal face has structures which in a spiral manner extend continuously across the construction height of the rotor or of the stator, the rotor including a first height at a radially outward extent of the rotor and a second height less than the first height at a radially inward extent of the rotor, the second height being defined by constrictions on opposite sides of the rotor.

2. The actuator module as claimed in claim 1, wherein the rotor is pretensioned in relation to the stator.

3. The actuator module as claimed in claim 2, wherein the rotor is pretensioned by way of a force by virtue of the magnetic flux between a non-centric stator and the rotor.

4. The actuator module as claimed in claim 2, wherein the rotor is pretensioned by way of a force on a shaft of the rotor.

5. The actuator module as claimed in claim 1, wherein the rotor is pretensioned counter to a centering spring.

6. The actuator module as claimed in claim 1, wherein the structures of the rotor external face are composed of grooves and/or ribs.

7. The actuator module as claimed in claim 1, wherein at least one groove and/or rib runs across the entire external shell of the rotor.

8. The actuator module as claimed in claim 1, wherein the construction height of the electric machine is determined by the stator, independently of the height of the rotor.

9. The actuator module as claimed in claim 1, wherein the electric machine is covered by a housing part of the application module.

10. The actuator module as claimed in claim 1, wherein the rotor is a plastics material injection-molded component.

11. The actuator module as claimed in claim 1, wherein the rotor contains overmolded or plastics-material-bonded magnets.

12. A method for producing an actuator module as claimed in claim 1, wherein the rotor or the stator is produced in a cylindrical tool, and demolding is performed by rotating the rotor or the stator out of the tool.

13. The actuator module as claimed in claim 1, wherein the radially outward extent of the rotor is positioned adjacent to the stator.

* * * * *